(12) United States Patent
Takeda et al.

(10) Patent No.: US 11,375,513 B2
(45) Date of Patent: Jun. 28, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 14 days.

(21) Appl. No.: 16/960,736

(22) PCT Filed: Jan. 11, 2018

(86) PCT No.: PCT/JP2018/000537
§ 371 (c)(1),
(2) Date: Jul. 8, 2020

(87) PCT Pub. No.: WO2019/138516
PCT Pub. Date: Jul. 18, 2019

(65) Prior Publication Data
US 2020/0344762 A1 Oct. 29, 2020

(51) Int. Cl.
*H04W 72/04* (2009.01)
*H04W 76/11* (2018.01)
(Continued)

(52) U.S. Cl.
CPC ..... *H04W 72/0493* (2013.01); *H04L 27/2607* (2013.01); *H04W 24/08* (2013.01); *H04W 74/0833* (2013.01); *H04W 76/11* (2018.02)

(58) Field of Classification Search
None
See application file for complete search history.

(56) References Cited

U.S. PATENT DOCUMENTS 10,517,083 B2 * 12/2019 You ........................ H04L 5/00
10,779,265 B2 * 9/2020 Kusashima ........... H04L 5/1469
(Continued)

FOREIGN PATENT DOCUMENTS

WO 2017209547 A1 12/2017

OTHER PUBLICATIONS

Extended European Search Report issued in counterpart European Patent Application No. 18900252.0, dated Jul. 19, 2021 (9 pages).
(Continued)

*Primary Examiner* — Phirin Sam
*Assistant Examiner* — Faiyazkhan Ghafoerkhan
(74) *Attorney, Agent, or Firm* — Osha Bergman Watanabe & Burton LLP

(57) ABSTRACT

A user terminal according to an aspect of the present disclosure includes a control section that determines a type of particular search space, based on certain information included in a search space configuration, and a receiving section that monitors a control resource set (CORESET) by using the particular search space. The control section is configured to necessarily determine at least two types including a type of search space for detecting a downlink control information format with CRC (Cyclic Redundancy Check) scrambled by a random access RNTI (Radio Network Temporary Identifier) and a type of user terminal-specific search space, based on one or a plurality of search space configurations. According to an aspect of the present disclosure, it is possible to appropriately associate a search space with a CORESET.

7 Claims, 11 Drawing Sheets

```
searchSpaceType      CHOICE {
  common0            SEQUENCE {
    Parameter 1      xxx, -- When this parameter is included, the DCI/RNTI is turned on
    Parameter 2      xxx,
    ...,
  },
  common0A           SEQUENCE {
    Parameter 3      xxx, -- When this parameter is included, the DCI/RNTI is turned on
    Parameter 4      xxx,
    ...,
  },
  common1            SEQUENCE {
    Parameter 5      xxx, -- When this parameter is included, the DCI/RNTI is turned on
    Parameter 6      xxx,
    ...,
  },
  ...
  ue-Specific        SEQUENCE {
    Parameter 7      xxx, -- When this parameter is included, the DCI/RNTI is turned on
    Parameter 8      xxx,
  }
} OPTIONAL, -- Need M
```

(51) Int. Cl.
  *H04L 27/26*  (2006.01)
  *H04W 24/08*  (2009.01)
  *H04W 74/08*  (2009.01)

(56) References Cited

U.S. PATENT DOCUMENTS

| | | | |
|---|---|---|---|
| 2011/0076962 A1* | 3/2011 | Chen | H04L 5/0053 455/68 |
| 2012/0039180 A1* | 2/2012 | Kim | H04W 52/0229 370/241 |
| 2013/0155990 A1* | 6/2013 | Nishio | H04W 72/042 370/329 |
| 2014/0086188 A1* | 3/2014 | Hoymann | H04L 5/0094 370/329 |
| 2014/0247816 A1* | 9/2014 | Kim | H04B 7/2656 370/336 |
| 2015/0063231 A1* | 3/2015 | Seo | H04L 1/0031 370/329 |
| 2016/0192335 A1* | 6/2016 | Kusashima | H04L 5/0053 370/280 |
| 2017/0366377 A1 | 12/2017 | Papasakellariou | |
| 2018/0279268 A1* | 9/2018 | You | H04L 5/0035 |
| 2019/0297601 A1* | 9/2019 | You | H04W 72/0446 |
| 2020/0021419 A1* | 1/2020 | Taherzadeh Boroujeni | H04L 5/0053 |
| 2020/0220703 A1* | 7/2020 | Kim | H04L 5/0051 |
| 2020/0252937 A1* | 8/2020 | Nishio | H04L 1/0038 |
| 2020/0337077 A1* | 10/2020 | Yoshimura | H04W 72/0446 |
| 2020/0358581 A1* | 11/2020 | Takeda | H04L 5/0094 |

OTHER PUBLICATIONS

Panasonic; "Discussion on DCI formats and A-CSI reporting in short-PUCCH"; 3GPP TSG RAN WG1 91, R1-1720496; Reno, USA, Nov. 27-Dec. 1, 2017 (4 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
3GPP TSG RAN WG1 Meeting 91; R1-1720812 "Remaining details on search space" NTT DOCOMO, Inc.; Reno, USA; Nov. 27-Dec. 1, 2017 (9 pages).
3GPP TSG RAN WG1 Meeting 90bis; R1-17xxxxx "Summary of email discussion [90b-NR-23]" NTT DOCOMO, Inc. Prague, CZ; Oct. 9-13, 2017 (13 pages).
3GPP TSG RAN WG1 NR Ad Hoc Meeting; R1-1801129 "Offline discussion for search space" NTT DOCOMO, Inc. Vancouver, Canada; Jan. 22-26, 2018 (5 pages).
3GPP TSG RAN WG1 Meeting #92; R1-1802480 "Search space" NTT DOCOMO, Inc.; Athens, Greece; Feb. 26-Mar. 2, 2018 (17 pages).
International Search Report issued in International Application No. PCT/JP2018/000537, dated Apr. 10, 2018 (5 pages).
Written Opinion issued in International Application No. PCT/JP2018/000537; dated Apr. 10, 2018 (4 pages).
Office Action issued in the counterpart Japanese Patent Application No. 2019-564220, dated Apr. 5, 2022 (8 pages).
3GPP TS 38.213 V15.0.0; "3rd Generation Partnership Project; Technical Specification Group Radio Access Network; NR; Physical layer procedures for control (Release 15)"; Dec. 2017 (56 pages).
Ericsson; "Text Proposal for L1 parametrs for 38.331"; 3GPP TSG-RAN WG2 #99bis, Tdoc R2-1711524; Prague, Czech Republic; Oct. 9-13, 2017 (26 pages).

* cited by examiner

```
SearchSpace ::=        SEQUENCE {
searchSpaceId          SearchSpaceId,
...
searchSpaceType        CHOICE {
common                 SEQUENCE {
...
int-RNTI               BIT STRING (SIZE (16))),
...
monitoringPeriodicity  FFS_Value   OPTIONAL
},
ue-Specific            SEQUENCE {
-- FFS: Parameters that are applicable only for USS?
}
} OPTIONAL, -- Need M
}
```

FIG. 2

```
searchSpaceType          CHOICE {
    common0              SEQUENCE {
        Parameter 1      xxx, -- When this parameter is included, the DCI/RNTI is turned on
        Parameter 2      xxx,
        ...
    },
    common0A             SEQUENCE {
        Parameter 3      xxx, -- When this parameter is included, the DCI/RNTI is turned on
        Parameter 4      xxx,
        ...
    },
    common1              SEQUENCE {
        Parameter 5      xxx, -- When this parameter is included, the DCI/RNTI is turned on
        Parameter 6      xxx,
        ...
    },
    ...
    ue-Specific          SEQUENCE {
        Parameter 7      xxx, -- When this parameter is included, the DCI/RNTI is turned on
        Parameter 8      xxx,
    }
} OPTIONAL, -- Need M
```

FIG. 3

```
searchSpaceType    CHOICE {
common             SEQUENCE {
Parameter 1        xxx, -- When this parameter is included, the DCI/RNTI is turned on
Parameter 2        xxx,
Parameter 3        xxx, -- When this parameter is included, the DCI/RNTI is turned on
Parameter 4        xxx,
Parameter 5        xxx, -- When this parameter is included, the DCI/RNTI is turned on
Parameter 6        xxx,
...,
},
ue-Specific        SEQUENCE {
Parameter 7        xxx, -- When this parameter is included, the DCI/RNTI is turned on
Parameter 8        xxx,
}
} OPTIONAL, -- Need M
```

FIG. 4

```
searchSpaceType    SEQUENCE {
    Parameter 1    xxx, -- When this parameter is included, the DCI/RNTI is turned on
    Parameter 2    xxx,
    Parameter 3    xxx, -- When this parameter is included, the DCI/RNTI is turned on
    Parameter 4    xxx,
    Parameter 5    xxx, -- When this parameter is included, the DCI/RNTI is turned on
    Parameter 6    xxx,
    ...,
    Parameter 7    xxx, -- When this parameter is included, the DCI/RNTI is turned on
    Parameter 8    xxx,
    ...,
} OPTIONAL, -- Need M
```

FIG. 5

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 13), a radio base station (for example, an eNB (eNode B)) transmits, to a user terminal (UE (User Equipment)), a physical layer control signal (for example, downlink control information (DCI)) by using a control channel (for example, a PDCCH (Physical Downlink Control Channel)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is studied to report a UE of DCI by using a control resource set (CORESET), which is allocation candidate regions of a control channel. A search space configuration associated with the CORESET is configured for the UE.

It is conceivable to define various types for search space. The types of search space are, in other words, information associating the characteristics (format and the like) of DCI to be transmitted on monitoring-target PDCCH candidates and a search space.

However, in currently studied search space configurations, there are no definitions for detailed types of search space. A study about what kind of information each search space configuration includes for the type of search space is not advanced yet. If an appropriate configuration method and UE operation are not employed, communication traffic increases unnecessarily and the like, and degradation in communication throughput, frequency use efficiency, and the like may occur.

In view of this, an object of the present disclosure is to provide a user terminal and a radio communication method which can appropriately associate a search space with a CORESET.

Solution to Problem

A user terminal according to an aspect of the present disclosure includes a control section that determines a type of particular search space, based on certain information included in a search space configuration, and a receiving section that monitors a control resource set (CORESET) by using the particular search space. The control section is configured to necessarily determine at least two types including a type of search space for detecting a downlink control information format with CRC (Cyclic Redundancy Check) scrambled by a random access RNTI (Radio Network Temporary Identifier) and a type of user terminal-specific search space, based on one or a plurality of search space configurations.

Advantageous Effects of Invention

According to an aspect of the present disclosure, it is possible to appropriately associate a search space with a CORESET.

BRIEF DESCRIPTION OF DRAWINGS

FIG. 2 is a diagram to show an example of a definition of an existing search space configuration;

FIG. 3 is a diagram to show an example of a definition of a search space configuration according to a first embodiment;

FIG. 4 is a diagram to show an example of a definition of a search space configuration according to a second embodiment;

FIG. 5 is a diagram to show an example of a definition of a search space configuration according to a variation of the second embodiment;

DESCRIPTION OF EMBODIMENTS

Figure 1:
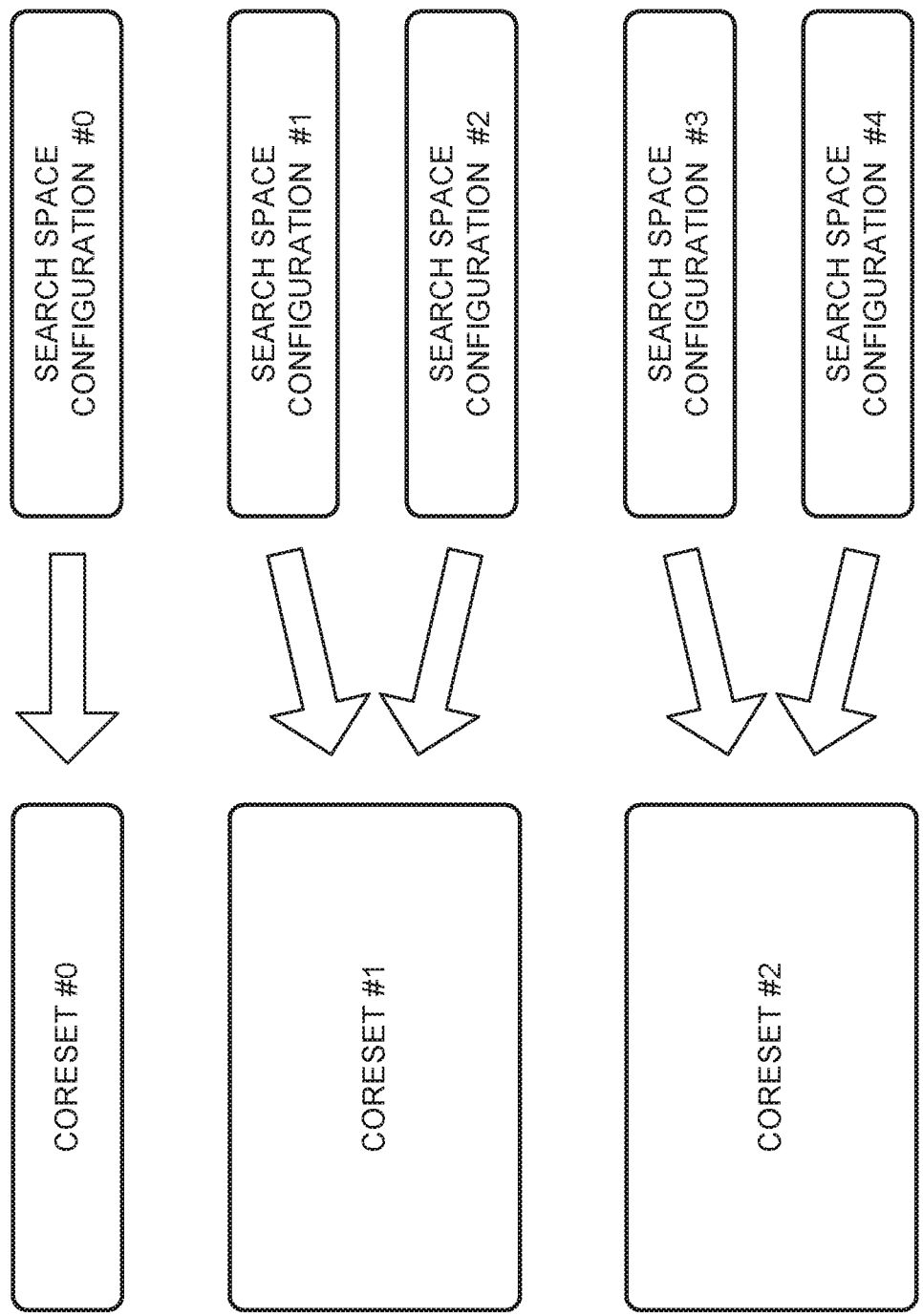
FIG. 1 is a diagram to show an example of mapping of CORESETs and search space configurations.

For NR, it is studied to use a control resource set (CORESET) in order to transmit a physical layer control signal (for example, downlink control information (DCI)) to a UE from a base station (which may be also referred to, for example, as a "BS (Base Station)," a "transmission/reception point (TRP)," an "eNB (eNodeB)," a "gNB (NR NodeB)," and the like).

The CORESET is allocation candidate regions of a control channel (for example, PDCCH (Physical Downlink Control Channel)). The UE may receive configuration information of a CORESET (which may be also referred to as a "CORESET configuration") from the base station. The UE can detect a physical layer control signal by monitoring the CORESET configured for the own terminal.

For example, the CORESET configuration may be reported by higher layer signaling. Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CE), MAC PDUs (Protocol Data Units), and the like. For example, the broadcast information may be master information blocks (MIBs), system information blocks (SIBs), minimum system information (RMSI (Remaining Minimum System Information)), and the like.

The CORESET configuration mainly includes information of resource-related configuration and RS-related configuration of a PDCCH, and may include information related to at least one of the following, for example:
  CORESET identifier (CORESET ID)
  Scramble ID for a demodulation reference signal (DMRS) for the PDCCH
  Time duration (for example, one, two, or three symbols)
  Frequency-domain resource allocation
  Mapping (interleaving or non-interleaving) of control channel elements (CCEs) and a resource element group (REG)
  REG bundling size
  Index of a shift amount in the case of interleaving
  Transmission configuration indication (TCI) state for the PDCCH, and
  TCI field activation/deactivation.

A search area and a search method for PDCCH candidates are defined as a search space (SS). The UE may receive configuration information of a search space (which may be also referred to as a "search space configuration") from the base station. For example, the search space configuration may be reported by higher layer signaling (RRC signaling or the like).

The search space configuration mainly includes information of monitoring-related configuration and decoding-related configuration of a PDCCH, and may include information related to at least one of the following, for example:
  Identifier of the search space (search space ID)
  CORESET ID related to the search space configuration
  Flag indicating common search space (C-SS (Common SS)) or UE-specific search space (UE-SS (UE-specific SS))
  Number of PDCCH candidates for each aggregation level
  Monitoring periodicity
  Monitoring offset, and
  Monitoring pattern in a slot (for example, 14-bit bitmap).

The UE monitors a CORESET, based on the search space configuration. "Monitoring of a CORESET" in the description of the present disclosure may be interpreted as "monitoring of a search space (PDCCH candidates) associated with the CORESET," "monitoring of a downlink control channel (for example, PDCCH)," and the like.

The UE can determine a correspondence between the CORESET and the search space, based on the CORESET ID included in the search space configuration. One CORESET may be associated with one or more search spaces.

FIG. 1 is a diagram to show an example of mapping of CORESETs and search space configurations. In this example, CORESET #0 corresponds to search space configuration #0, CORESET #1 corresponds to search space configurations #1 and #2, and CORESET #2 corresponds to search space configurations #3 and #4.

Each case where a plurality of search space configurations are associated with one CORESET corresponds, for example, to a case where both C-SS and UE-SS are configured in the CORESET. Note that one search space configuration may be associated with a plurality of CORESETs.

As examples of a search space in which the UE monitors PDCCH candidates, the following search spaces are studied:
  Type0-PDCCH C-SS
  Type0A-PDCCH C-SS
  Type1-PDCCH C-SS
  Type2-PDCCH C-SS
  Type3-PDCCH C-SS, and
  UE-SS.

Type-PDCCH C-SS may be referred to as a "SS for a DCI format with cyclic redundancy check (CRC) masked (scrambled) by a system information radio network temporary identifier (SI-RNTI)."

Type0A-PDCCH C-SS may be referred to as a "SS for a DCI format with CRC scrambled by an SI-RNTI."

Note that Type0-PDCCH may be used, for example, for report about RMSI, while Type0A-PDCCH may be used, for example, for report about any of other types of SI (OSI (Other SI)).

Type1-PDCCH C-SS may be referred to as an "SS for a DCI format with CRC scrambled by a random access RNTI (RA-RNTI), a temporary cell RNTI (TC-RNTI), or a cell RNTI (C-RNTI)."

Type2-PDCCH C-SS may be referred to as an "SS for a DCI format with CRC scrambled by a paging RNTI (P-RNTI)."

Type3-PDCCH C-SS may be referred to as an "SS for a DCI format with CRC scrambled by an INT-RNTI (INTerruption RNTI) for DL preemption indication, an SFI-RNTI (Slot Format Indicator RNTI) for slot format indication, a TPC-PUSCH-RNTI for transmit power control (TPC) of a PUSCH (Physical Uplink Shared Channel), a TPC-PUCCH-RNTI for TPC of a PUCCH (Physical Uplink Control Channel), a TPC-SRS-RNTI for TPC of an SRS (Sounding Reference Signal), a C-RNTI, or a CS-RNTI (Configured Scheduling RNTI).

UE-SS may be referred to as a "SS for a DCI format with CRC scrambled by a C-RNTI or a CS-RNTI."

Each type of search space is, in other words, information associating the characteristics (format, RNTI, and the like) of DCI to be transmitted on monitoring-target PDCCH candidates and a search space.

It is also conceivable to define various types for C-SS, UE-SS, and the like. However, in currently studied search space configurations, there are no definitions for types of C-SS, and the UE can only recognize for each monitoring-target PDCCH candidate that the PDCCH candidate corresponds to C-SS or UE-SS.

FIG. 2 is a diagram to show an example of a definition of an existing search space configuration. In FIG. 2, the description is based on ASN.1 (Abstract Syntax Notation One) notation. This similarly applies to FIGS. 3, 4, and 5 to be described later.

A search space information element (SearchSpace IE) in FIG. 2 corresponds to the above-described search space configuration. The search space IE includes a parameter (searchSpaceType) indicating whether the search space is a C-SS or UE-SS, together with other types of information such as a search space ID.

In FIG. 2, it is indicated that information such as an INT-RNTI and a monitoring periodicity is further included when the parameter indicates C-SS. However, a study about what kind of information a search space IE includes for the type of search space is not advanced yet. If an appropriate configuration method and UE operation are not employed, communication traffic increases unnecessarily and the like, and degradation in communication throughput, frequency use efficiency, and the like may occur.

In view of this, the inventors of the present invention came up with the idea of a configuration method for an SS to be appropriately associated with a CORESET.

Embodiments according to the present disclosure will be described in detail with reference to the drawings as follows. The radio communication method according to each embodiment may be employed independently or may be employed in combination.

(Radio Communication Method)

First Embodiment

In a first embodiment, a search space configuration (IE) includes information indicating the type of a corresponding search space (which may be referred to as "search space type information"). The UE can identify the type of search space to which the configured search space IE corresponds, based on the information.

FIG. 3 is a diagram to show an example of a definition of search space type information according to the first embodiment.

The search space IE is configured to include search space type information that specifically identifies one search space.

In the search space type information (here, searchSpaceType), a sequence "common0" indicating Type0-PDCCH C-SS, a sequence "common0A" indicating Type0A-PDCCH C-SS, a sequence "common1" indicating Type1-PDCCH C-SS, a sequence "common2" indicating Type2-PDCCH C-SS, a sequence "common3" indicating Type3-PDCCH C-SS, or a sequence "ue-Specific" indicating UE-SS, and the like are defined, for example.

Note that the "sequence" here is one of fields, representing a type of ASN.1 object and may be referred to as a "sequence type." For example, the sequence "common0" may indicate that the value of "common0" represents a sequence type and that the sequence "common0" is constituted of a plurality of value fields, for example.

For example, in a case that the UE is reported about a search space IE including information of "common0," the UE can determine that the search space corresponds to Type-PDCCH C-SS.

Note that the sequence indicating a type may include a parameter (which may be referred to as a "DCI format specifying parameter") that specifies one or a plurality of DCI formats to be detected for the type.

The sequence indicating a type may include a parameter (which may be also referred to as an "RNTI specifying parameter") that specifies one or a plurality of RNTIs to be detected for the type (which may be referred to as a "RNTI" corresponding to a monitoring-target DCI format).

Parameters 1, 3, 5, and 7 and the like shown in FIG. 3 are examples of the DCI format specifying parameter and/or the RNTI specifying parameter.

In a case that search space type information includes "common3" and the DCI format specifying parameter included in "common3" indicates, for example, "DCI format 2_0," the UE for which the IE is configured may determine to monitor DCI format 20 in Type3-PDCCH C-SS.

In a case that search space type information includes "common3" and the DCI format specifying parameter included in "common3" indicates, for example, "DCI format 2_0, DCI format 2_1," the UE for which the IE is configured may determine to monitor DCI formats 20 and 21 in Type3-PDCCH C-SS.

In a case that search space type information includes "common3" and the RNTI specifying parameter included in "common3" indicates, for example, "INT-RNTI," the UE for which the IE is configured may determine to monitor a PDCCH scrambled with an INT-RNTI in Type3-PDCCH C-SS.

In a case that search space type information includes "common3" and the RNTI specifying parameter included in "common3" indicates, for example, "INT-RNTI, SFI-RNTI," the UE for which the IE is configured may determine to monitor a PDCCH scrambled with an INT-RNTI or SFI-RNTI in Type3-PDCCH C-SS.

The DCI format specifying parameter and the RNTI specifying parameter may be configured to be included when search space type information indicates a particular value (for example, "common3" or "ue-Specific").

When the DCI format specifying parameter or the RNTI specifying parameter is present, detection of a target DCI format or RNTI is triggered, and hence the DCI format specifying parameter and the RNTI specifying parameter may be referred to, for example, as a "DCI format detection trigger parameter" and an "RNTI detection trigger parameter," respectively.

According to the first embodiment described above, the UE can properly figure out the search space type to which a search space configuration (IE) corresponds and can identify the DCI format to be detected by using the search space type.

Second Embodiment

While such a configuration of distinguishing C-SSs according to type as that described above is studied, the inventors of the present invention also studied a configuration of not distinguishing C-SSs according to type. This is because each type described above is identifiable based on an RNTI and/or a DCI format, and hence the UE can substantially distinguish the types of C-SS from each other even though the types of C-SS are not defined.

The second embodiment corresponds to a case where C-SS and U-SS are defined as search spaces while no type is defined for each SS.

FIG. 4 is a diagram to show an example of a definition of search space type information according to the second embodiment. The search space IE is configured to include a sequence ("common" or "ue-Specific") specifically identifying one search space (C-SS or UE-SS). The sequence corresponds to search space type information.

For example, in a case that the UE is reported about a search space IE including information indicating "common," for example, the UE can determine that the search space corresponds to C-SS.

Note that the sequence identifying a search space may include a parameter (which may be referred to as a "DCI format specifying parameter") that specifies one or a plurality of DCI formats to be detected for the search space. The sequence identifying a search space may include a parameter (which may be referred to as an "RNTI specifying parameter") that specifies one or a plurality of RNTIs to be detected for the type.

Parameters 1, 3, 5, and 7 and the like shown in FIG. 4 are examples of the DCI format specifying parameter and/or the RNTI specifying parameter.

In a case that search space type information includes "common" and the DCI format specifying parameter included in "common" indicates, for example, "DCI format 2_0," the UE for which the IE is configured may determine to monitor DCI format 20 in a C-SS.

In a case that search space type information includes "common" and the DCI format specifying parameter included in "common" indicates, for example, "DCI format 2_0, DCI format 2_1," the UE for which the IE is configured may determine to monitor DCI formats 20 and 21 in a C-SS.

In a case that search space type information includes "common" and the RNTI specifying parameter included in "common" indicates, for example, "INT-RNTI," the UE for which the IE is configured may determine to monitor a PDCCH scrambled with an INT-RNTI in a C-SS.

In a case that search space type information includes "common" and the RNTI specifying parameter included in "common" indicates, for example, "INT-RNTI, SFI-RNTI," the UE for which the IE is configured may determine to monitor a PDCCH scrambled with an INT-RNTI or SFI-RNTI in a C-SS.

Although types of SS need not be distinguished in the mode according to the second embodiment as described above, monitoring of a plurality of types may be configured by using one piece of search space type information.

For example, in a case that the search space type information includes "common" and the RNTI specifying parameter included in "common" indicates, for example, "SI-RNTI, RA-RNTI, SFI-RNTI, C-RNTI," this may be equivalent for the UE for which the IE is configured, to be configured to monitor Type0, Type0A, Type1, and Type3-PDCCH C-SS described above.

Note that, in a case of configuring monitoring of a plurality of types in the mode according to the first embodiment, a plurality of pieces of search space type information are configured. For example, when a search space IE including "common0," a search space IE including "common0A," a search space IE including "common1," and a search space IE including "common3" are configured for the UE, this means that the UE is configured to monitor Type0, Type0A, Type1, and Type3-PDCCH C-SS.

According to the second embodiment described above, the UE can properly identify a DCI format to be detected in the search space to which a search space configuration (IE) corresponds.

Variation of Second Embodiment

Although a search space IE includes a sequence ("common" or "ue-Specific") identifying C-SS or UE-SS in the second embodiment, such distinction may also be omitted in search space type information.

FIG. 5 is a diagram to show an example of a definition of search space type information according to a variation of the second embodiment. The search space type information is constituted of a sequence of parameters for one or a plurality of search spaces. As described above in FIGS. 3 and 4, Parameters 1 to 6 are parameters for monitoring a search space corresponding to a known C-SS, and Parameters 7 and 8 are parameters for monitoring a search space corresponding to a known UE-SS.

Note that search space type information may explicitly include a parameter indicating that the search space corresponds to any one of or a plurality of types of C-SS, UE-SS, and SS.

According to the configuration of the variation of the second embodiment, all SSs associated with a particular CORESET can be configured by using one search space configuration irrespective of types of C-SS, UE-SS, and SS (if any).

<Variations>

Note that, in NR, the UE operates according to whether the UE is stand-alone (SA) to operate independently without working with any existing RAT (Radio Access Technology) (for example, LTE) or non-stand-alone (NSA) to operate with an existing RAT.

In either cases based on the SA operation and the NSA operation, it may be assumed that the UE monitors a search space corresponding to Type1-PDCCH C-SS described above and/or receives a configuration for monitoring the search space. In this case, the UE can perform, for example, a random access procedure using a random access RNTI without fail, to thereby establish communication with a network.

Note that a "search space corresponding to Type1-PDCCH C-SS" may mean a search space for detecting a DCI format with CRC scrambled by an RA-RNTI.

In either cases based on the SA operation and the NSA operation, it may be assumed that the UE monitors a search space corresponding to the UE-SS described above and/or receives a configuration for monitoring the search space. In this case, the UE can perform, for example, the UE-specific communication with the base station without fail.

The UE may be configured to necessarily determine (necessarily monitor) at least a certain search space type, based on one or a plurality of search space configurations. For example, the UE may be configured to necessarily determine (necessarily monitor) at least two types, Type1-PDCCH C-SS and UE-SS, based on one or a plurality of search space configurations.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
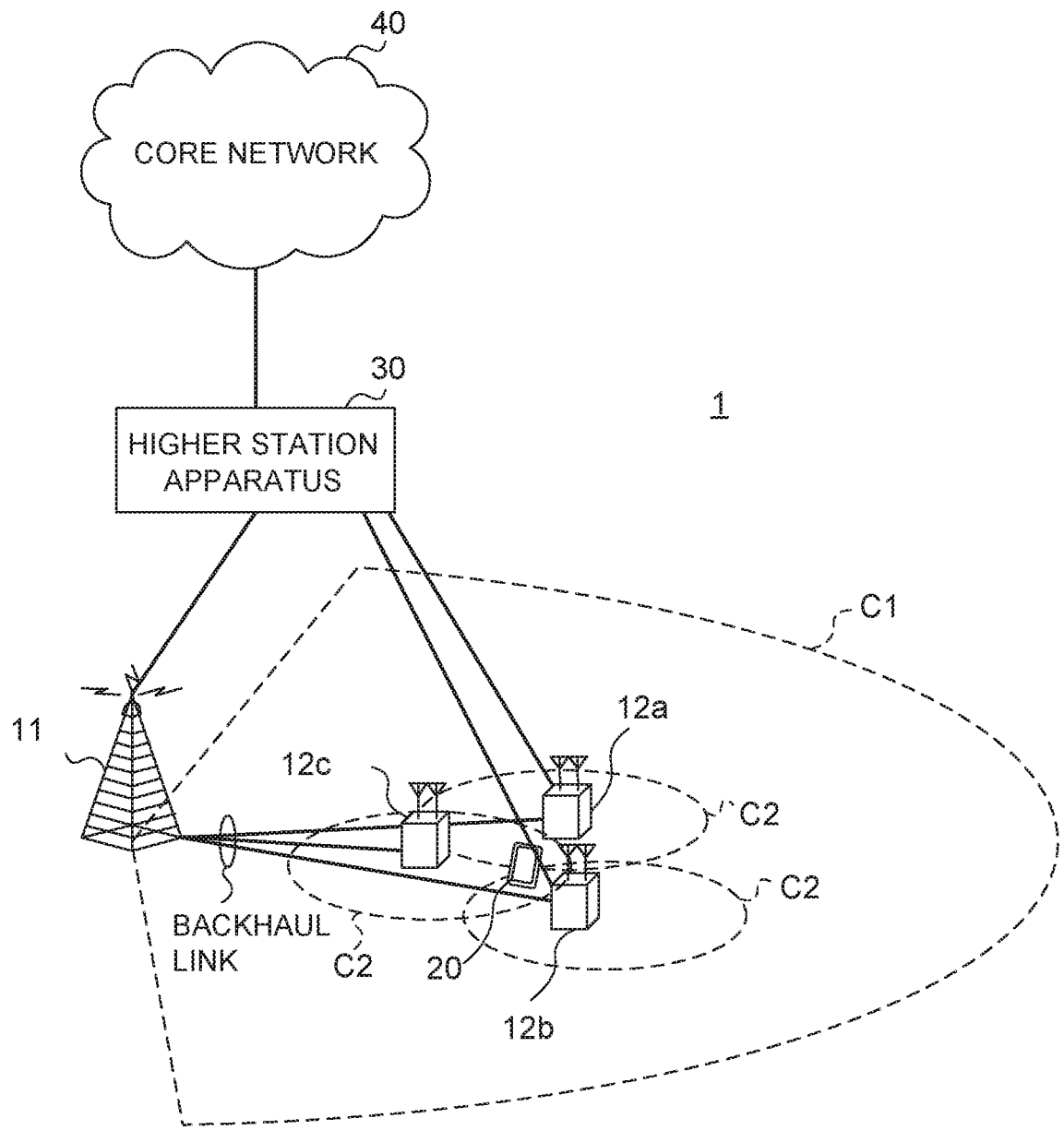
FIG. 6 is a diagram to show an example of a schematic structure of a radio communication system according to one embodiment.

FIG. 6 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 7:
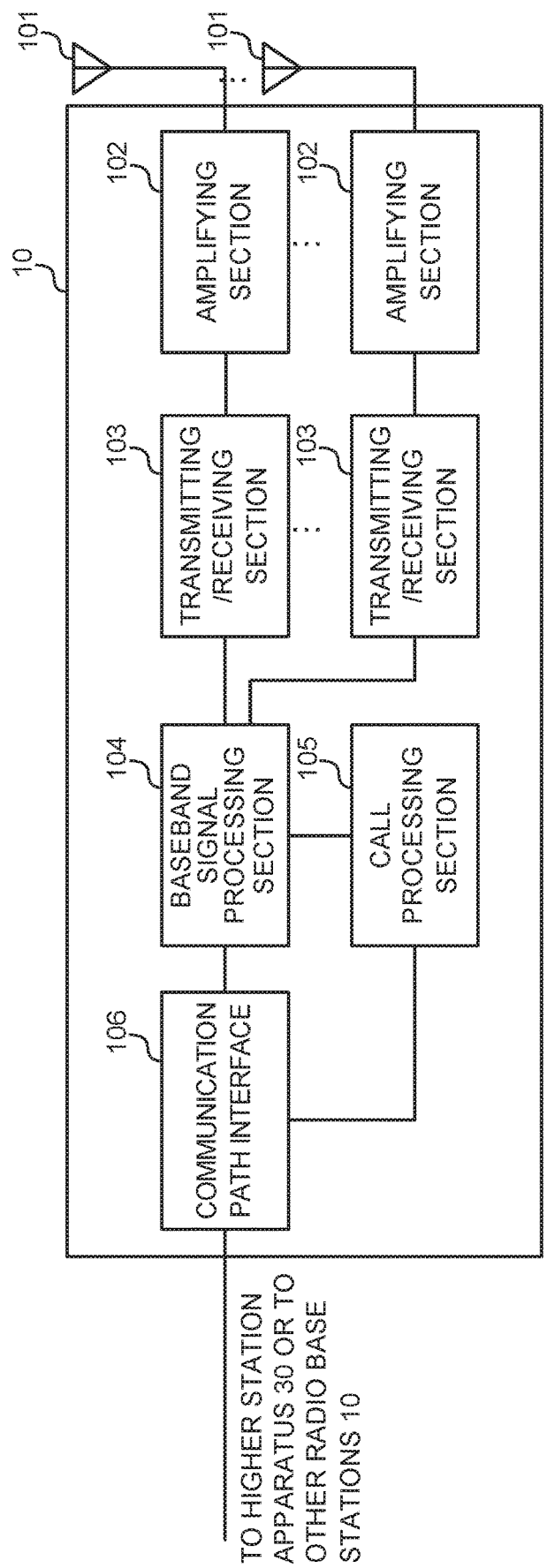
FIG. 7 is a diagram to show an example of an overall structure of a radio base station according to one embodiment.

FIG. 7 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources, and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 may transmit downlink control information (for example, DCI) by using a control resource set (CORESET) associated with a particular search space.

The transmitting/receiving sections 103 may transmit CORESET configurations, search space configurations, and the like to the user terminals 20.

Figure 8:
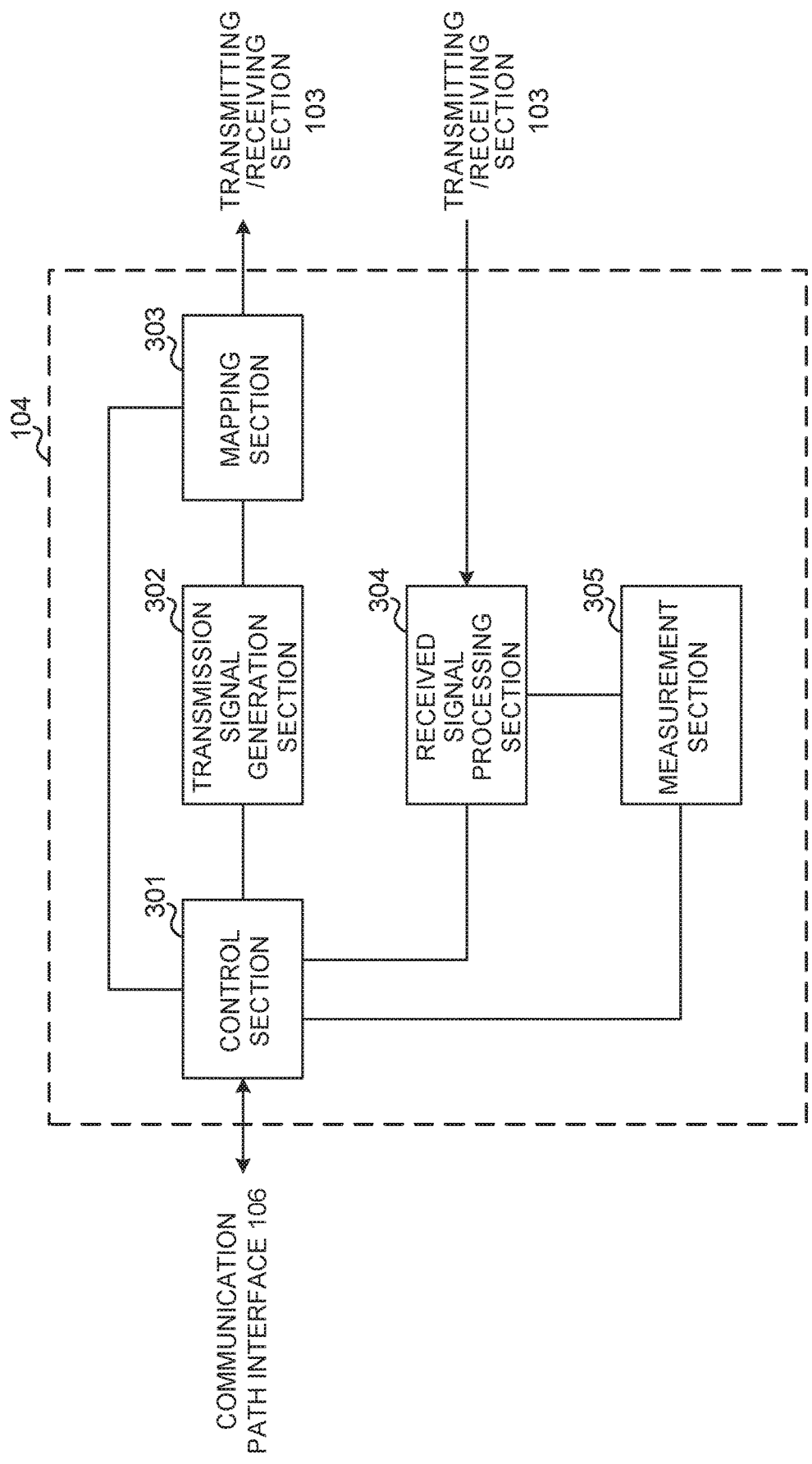
FIG. 8 is a diagram to show an example of a functional structure of the radio base station according to one embodiment.

FIG. 8 is a diagram to show an example of a functional structure of the radio base station according to one embodiment of the present disclosure. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH, such as transmission confirmation information). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH, such as transmission confirmation information), a random access preamble (for example, a signal transmitted on the PRACH), an uplink reference signal, and so on.

The control section 301 may perform control of transmitting DCI by using a CORESET. The control section 301 may perform control of generating DCI by using a particular DCI format and the RNTI corresponding to the format and transmitting the DCI, in a particular search space.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

(User Terminal)

Figure 9:
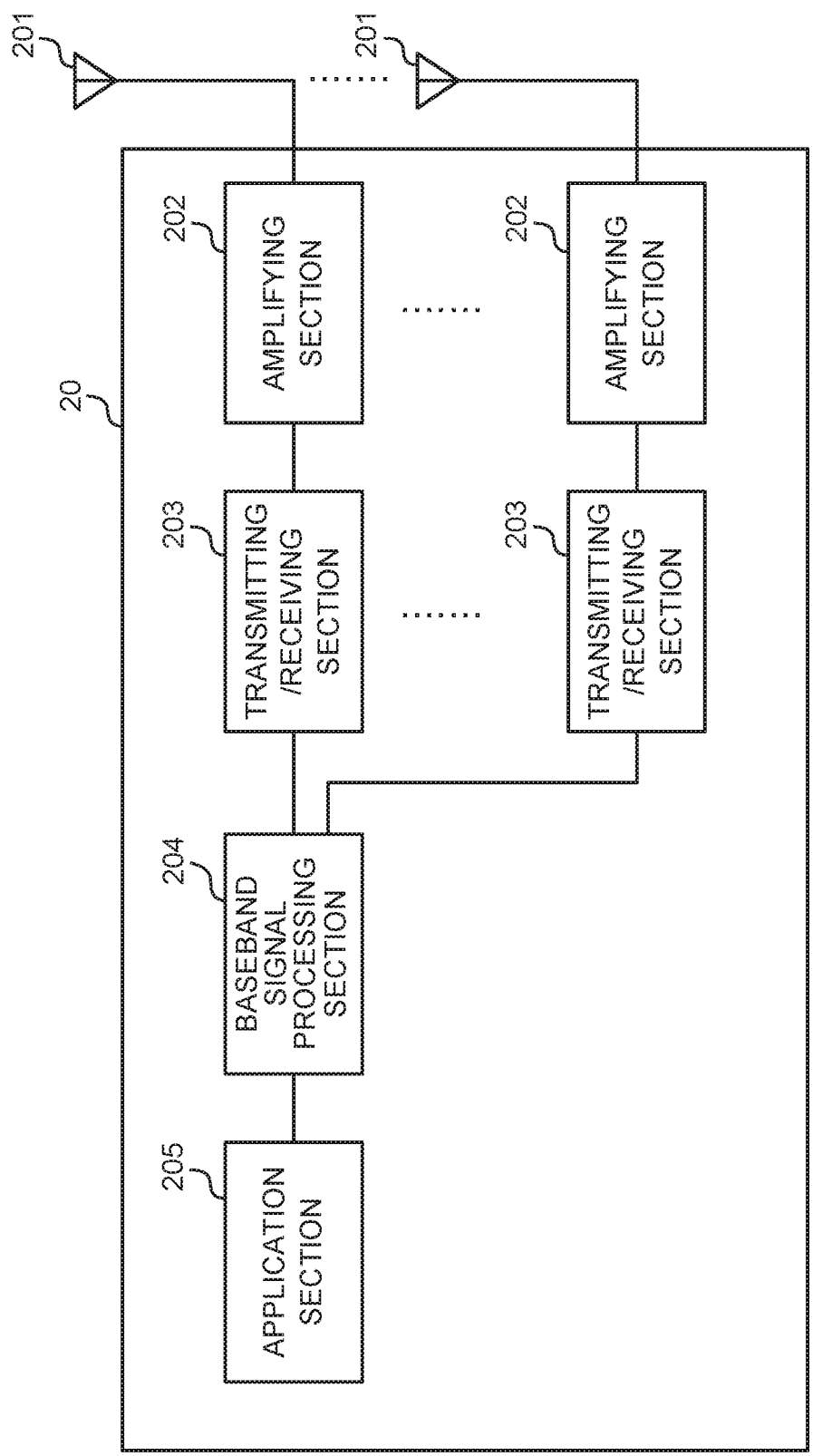
FIG. 9 is a diagram to show an example of an overall structure of a user terminal according to one embodiment.

FIG. 9 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 may monitor a control resource set (CORESET) by using the particular search space determined by the control section 401 to be described later.

The transmitting/receiving sections 203 may receive CORESET configurations, search space configurations, and the like from the radio base station 10.

Figure 10:
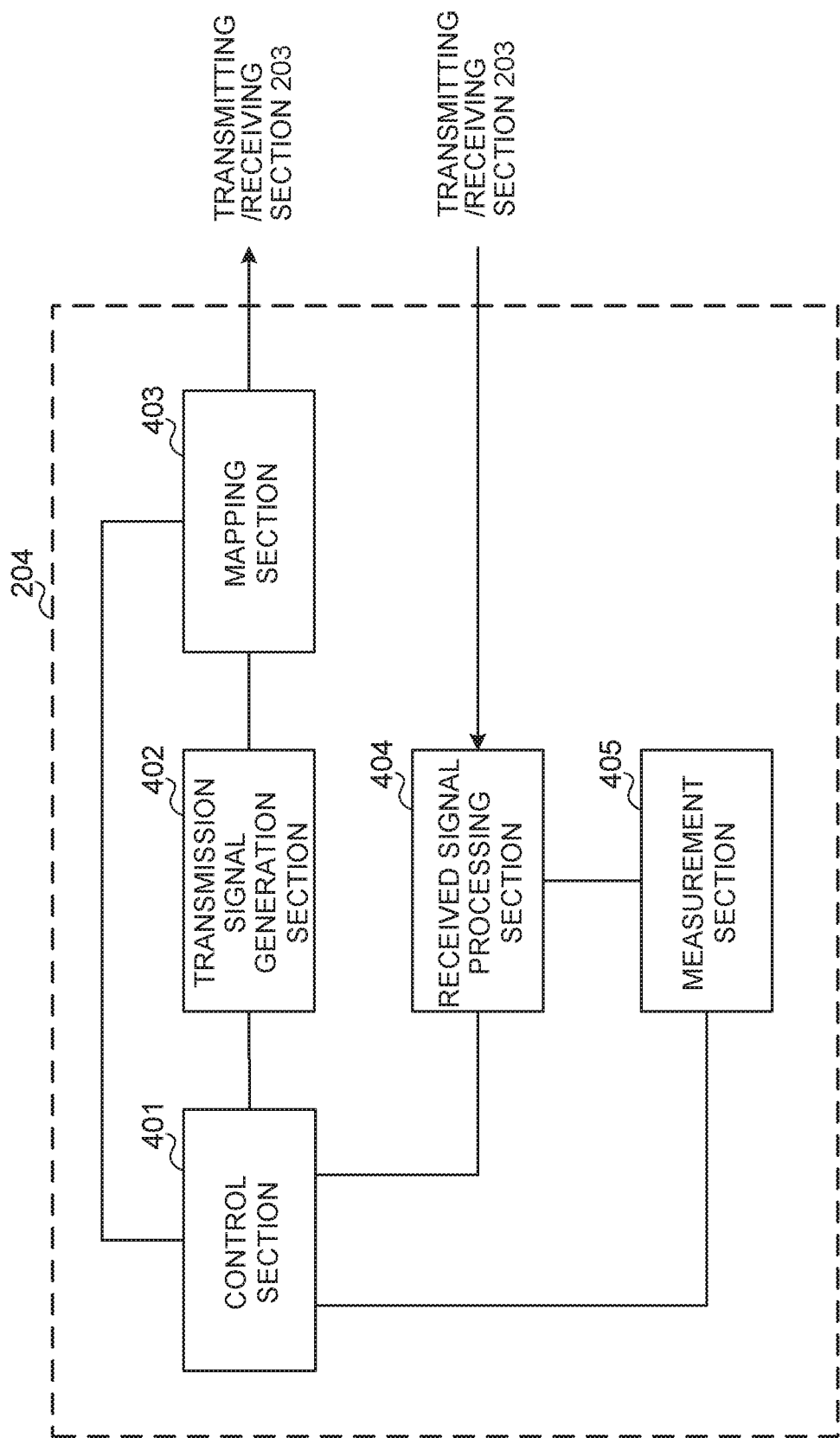
FIG. 10 is a diagram to show an example of a functional structure of the user terminal according to one embodiment.

FIG. 10 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may determine the type of particular search space, based on certain information included in a search space configuration (which may, for example, be referred to as "search space type information").

The certain information may include information for identifying any one of a plurality of types (for example, Type0/0A/1/2/3-PDCCH C-SS) of common search space (C-SS).

Information for identifying any one of the plurality of types of C-SS may include a parameter specifying at least one of the DCI format to be detected for the type and the RNTI corresponding to the format. The control section 401 may identify the DCI format to be detected by using the particular search space, based on the parameter.

The certain information may include information indicating that the particular search space is a C-SS (for example, information indicating C-SS but not specifying any of the plurality of types of C-SS), and the information may further include a plurality of parameters each specifying at least one of the DCI format to be detected for the C-SS and the RNTI corresponding to the format. The control section 401 may identify the DCI format to be detected by using the particular search space, based on the plurality of parameters thus included.

Note that, in this specification, descriptions about a particular SS (for example, C-SS) may be interpreted as descriptions about any other SS (for example, U-SS or another SS).

The control section 401 may be configured to necessarily determine at least two types, the type of a search space to detect a DCI format with CRC (Cyclic Redundancy Check) scrambled by a random access RNTI (Radio Network Temporary Identifier) and the type of a user terminal specific search space (UE-SS), based on one or a plurality of search space configurations.

Here, the type of UE-SS may indicate UE-SS. In other words, the UE-SS may not necessarily be configured to further include a plurality of types. The search space type information may be information indicating C-SS or UE-SS.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit, or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 11:
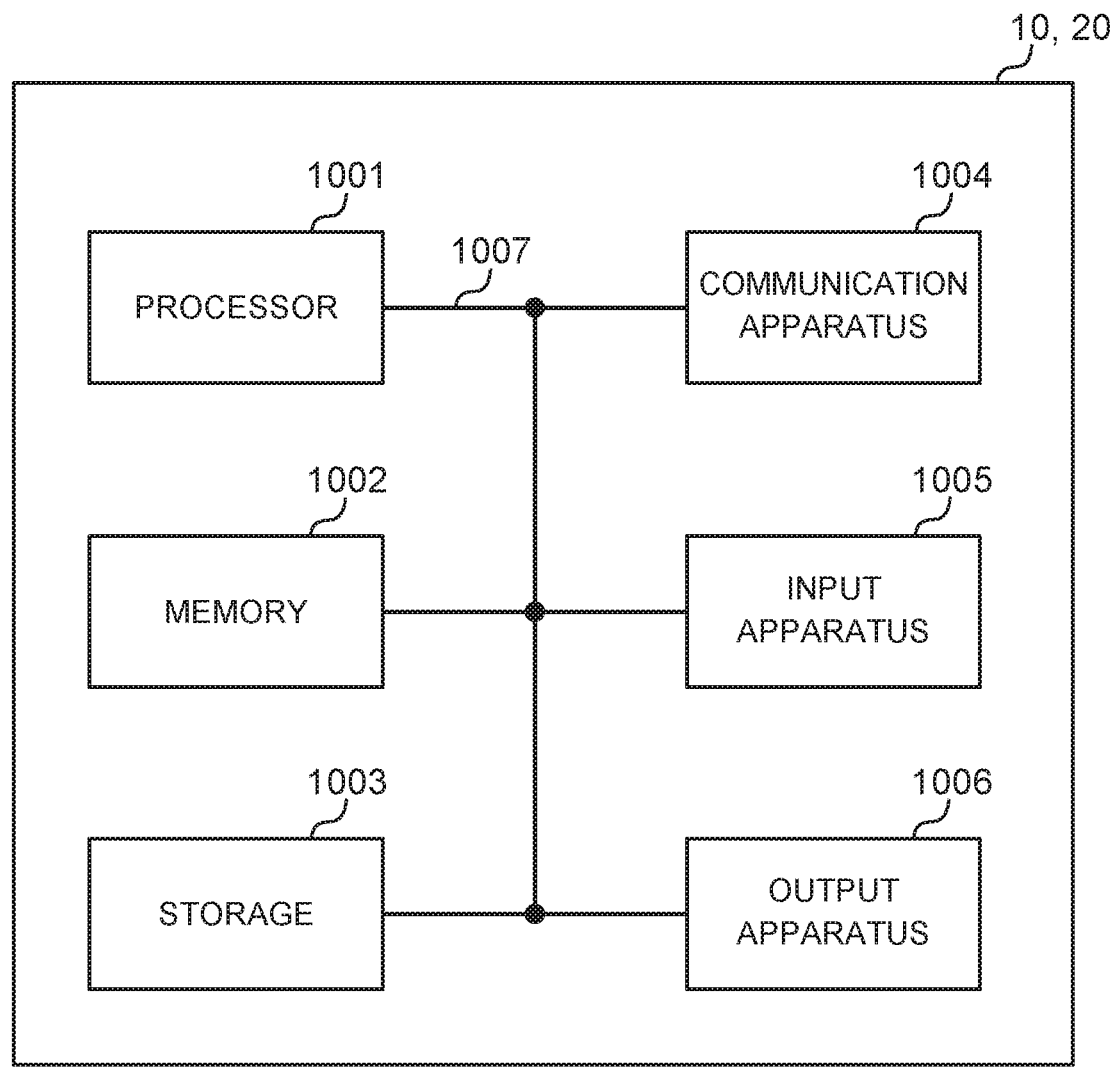
FIG. 11 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 11 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to one embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table.

The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description in this specification is provided only for the purpose of explaining examples, and should by no means be construed to limit the invention according to the present disclosure in any way.

What is claimed is:

1. A terminal comprising:
    a processor that determines a type of a specific search space based on search space type information indicating a common search space or a User Equipment (UE)-specific search space; and
    a receiver that monitors, in the specific search space, physical downlink control channel (PDCCH) candidates for one or a plurality of downlink control information (DCI) formats indicated by one or a plurality of parameters indicating the DCI formats,
    wherein the one or plurality of parameters are included in the search space type information, and
    the receiver monitors PDCCH candidates in a type 1 PDCCH common search space or monitors PDCCH candidates in the UE-specific search space.

2. The terminal according to claim 1, wherein the receiver monitors the PDCCH candidates in the UE-specific search space based on the search space type information.

3. The terminal according to claim 1, wherein the receiver necessarily monitors the PDCCH candidates in the type 1 PDCCH common search space and the PDCCH candidates in the UE-specific search space.

4. The terminal according to claim 2, wherein the receiver necessarily monitors the PDCCH candidates in the type 1 PDCCH common search space and the PDCCH candidates in the UE-specific search space.

5. A radio communication method for a terminal, comprising:
    determining a type of a specific search space based on search space type information indicating a common search space or a UE-specific search space; and
    monitoring, in the specific search space, physical downlink control channel (PDCCH) candidates for one or a plurality of downlink control information (DCI) formats indicated by one or a plurality of parameters indicating the DCI formats,
    wherein the one or plurality of parameters are included in the search space type information, and
    the terminal monitors PDCCH candidates in a type 1 PDCCH common search space or monitors PDCCH candidates in the UE-specific search space.

6. A base station comprising:
    a transmitter that transmits, to a terminal, search space type information that indicates a common search space or a User Equipment (UE)-specific search space and includes one or a plurality of parameters that indicate downlink control information (DCI) formats; and
    a processor that controls physical downlink control channel (PDCCH) transmission in PDCCH candidates for the DCI formats indicated by the one or plurality of parameters in specific search space of which a type is determined in the terminal based on the search space type information,
    wherein the processor controls the PDCCH transmission in PDCCH candidates in a type 1 PDCCH common search space or controls the PDCCH transmission in PDCCH candidates in the UE-specific search space.

7. A system comprising:
    a terminal that comprises:
        a first processor that determines a type of a specific search space based on search space type information indicating a common search space or a User Equipment (UE)-specific search space; and a receiver that monitors, in the specific search space, physical downlink control channel (PDCCH) candidates for one or a plurality of downlink control information (DCI) formats indicated by one or a plurality of parameters indicating the DCI formats,
wherein the one or plurality of parameters are included in the search space type information, and
the receiver monitors PDCCH candidates in a type 1 PDCCH common search space or monitors PDCCH candidates in the UE-specific search space; and
a base station that comprises:
  a transmitter that transmits, to the terminal, the search space type information; and
  a second processor that controls PDCCH transmission in PDCCH candidates for the DCI formats in the specific search space.

* * * * *